Patented June 14, 1949

2,473,042

UNITED STATES PATENT OFFICE 2,473,042

3,5-DIHYDROXY-4-DIHYDRO-THIADIAZINE-1-DIOXIDE AND ITS PREPARATION

Henry A. Walter, Longmeadow, Mass., assignor to Monsanto Chemical Company, St. Louis, Mo., a corporation of Delaware No Drawing. Application August 6, 1947.
Serial No. 766,894

2 Claims. (Cl. 260—243)

This invention relates to a new chemical compound. More particularly, the invention relates to 3,5-dihydroxy-4-dihydro thiadiazine-1-dioxide and to a process for preparing it.

An object of this invention is to provide 3,5-dihydroxy-4-dihydro thiadiazine-1-dioxide.

A further object is to provide a process for preparing 3,5-dihydroxy-4-dihydro thiadiazine-1-dioxide.

These and other objects are attained by reacting sulfamide with malononitrile and then hydrolyzing the product.

The following example is given in illustration and is not intended to limit the scope of this invention.

Example I 1 mol of sulfamide and 1 mol of malononitrile were dissolved in ethanol. The solution was maintained at 30° C. with constant agitation for about 1 hour. The product was insoluble in alcohol and precipitated from the solution as it was formed. It was recovered by filtration and washed with ethanol. The product was found to be 3,5-diamino-4-dihydro thiadiazine-1-dioxide. It was then dissolved in hot water containing 1% by weight of concentrated hydrochloric acid. The solution was heated on a steam bath for about 1 hour. The solution was then evaporated to dryness, yielding a fine white powder which, on analysis, proved to be 3,5-dihydroxy-4-dihydro thiadiazine-1-dioxide.

The reaction between sulfamide and malononitrile to produce 3,5-diamino-4-dihydro thiadiazine-1-dioxide is disclosed and claimed in my copending application Ser. No. 766,893, now Patent No. 2,454,262. It normally is carried out by reacting together substantially equimolar proportions of sulfamide and malononitrile at temperatures ranging from 15° C. to 100° C. The presence of a catalyst such as sodium ethylate, sodium carbonate, etc., is advantageous, but not necessary.

The hydrolysis reaction may be carried out in the presence of any of the normal acid hydrolysis catalysts at temperatures ranging from room temperature (ca. 25–30° C.) up to reflux temperature at atmospheric pressure.

3,5-dihydroxy-4-dihydro thiadiazine-1-dioxide is valuable per se for pharmaceutical purposes, especially in connection with control of blood pressure and it may be used as an intermediate for preparing other pharmaceuticals.

The compound has the following structural formula

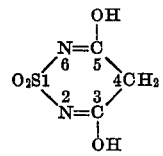

It is obvious that variations may be made in the process and product of this invention without departing from the spirit and scope thereof as defined in the appended claims.

What is claimed is:

1. 3,5-dihydroxy-4-dihydro thiadiazine-1-dioxide.

2. A process for preparing 3,5-dihydroxy-4-dihydro thiadiazine-1-dioxide which comprises reacting together substantially equimolar proportions of sulfamide and malononitrile, hydrolyzing the product and then recovering said 3,5-dihydroxy-4-dihydro-thiadiazine-1-dioxide.

HENRY A. WALTER.

No references cited.